US009929930B2

(12) United States Patent
Curtin et al.

(10) Patent No.: US 9,929,930 B2
(45) Date of Patent: Mar. 27, 2018

(54) REDUCING AN AMOUNT OF CAPTURED NETWORK TRAFFIC DATA TO ANALYZE

(71) Applicant: Tektronix, Inc., Beaverton, OR (US)

(72) Inventors: John P. Curtin, Richardson, TX (US); Vignesh Janakiraman, Plano, TX (US)

(73) Assignee: NetScout Systems Texas, LLC, Plano, TX (US)

( * ) Notice: Subject to any disclaimer, the term of this patent is extended or adjusted under 35 U.S.C. 154(b) by 214 days.

(21) Appl. No.: 15/000,963

(22) Filed: Jan. 19, 2016

(65) Prior Publication Data

US 2017/0207990 A1 Jul. 20, 2017

(51) Int. Cl.
*G06F 15/173* (2006.01)
*H04L 12/26* (2006.01)

(52) U.S. Cl.
CPC ............ *H04L 43/12* (2013.01); *H04L 43/028* (2013.01)

(58) Field of Classification Search
USPC ........................................ 709/218, 223, 224
See application file for complete search history.

(56) References Cited

U.S. PATENT DOCUMENTS

| | | | | |
|---|---|---|---|---|
| 5,123,017 A * | 6/1992 | Simpkins | ............ | G06F 11/2294 706/911 |
| 6,674,738 B1 * | 1/2004 | Yildiz | ................... | H04L 1/0045 370/338 |
| 7,016,948 B1 * | 3/2006 | Yildiz | ..................... | H04L 43/18 709/221 |
| 9,712,381 B1 * | 7/2017 | Emanuel | ............ | H04L 41/0677 |
| 2011/0276951 A1 * | 11/2011 | Jain | ..................... | G06F 11/3006 717/140 |
| 2015/0100680 A1 * | 4/2015 | Djuric | ................... | H04L 41/145 709/224 |
| 2016/0072877 A1 * | 3/2016 | Hirschfeld | ............ | G06F 9/5044 709/226 |

* cited by examiner

*Primary Examiner* — Liangche A Wang
(74) *Attorney, Agent, or Firm* — Locke Lord LLP; Scott D. Wofsy; Christopher J. Capelli (57) ABSTRACT

A system and method for monitoring a communication network is provided. The method includes capturing network data from network traffic of the communication network by a plurality of probes monitoring the communication network. The method further includes detecting by light-weight analysis a data packet of the captured network data that includes information related to a transactional procedure failure transacted by an end-user device and determining an identity of the end-user device. The method further includes sharing the identity of the end-user device with other probes of the plurality of probes, adding the end-user device's identity to respective whitelists associated with the probes of the plurality of probes, and performing, for end-user device identities included in the respective whitelists, detailed analysis of network data during a predetermined time period.

23 Claims, 4 Drawing Sheets

REDUCING AN AMOUNT OF CAPTURED NETWORK TRAFFIC DATA TO ANALYZE

FIELD OF THE INVENTION

The present technology relates to monitoring network traffic data, more particularly, methods and systems to reduce amount of captured network traffic data to analyze.

BACKGROUND OF THE INVENTION

Probes can be deployed at one or more locations of a communication network to gather network data that can be analyzed for monitoring captured network traffic data. The probes can be physical probes that are physically deployed at one or more locations of the communications network, or virtual probes that can be deployed by a remote computer. Virtual probes can capture vast amounts of network traffic data due to the relative ease of deployment and reduced access restrictions relative to that of physical probes. It can become impractical, burdensome, or impossible to monitor or analyze the captured data.

Methods have been developed that use light-weight session tracking (LST) in which a portion of the captured data is selected for analysis to lighten the monitoring and analyzing loads. However, the selection is performed manually. Accordingly, there is a need to automatically select data from the captured network traffic data for monitoring and/or analysis.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a communication network monitoring system is provided, including a plurality of probes monitoring respective locations of a communication network. Each of the probes includes programmable instructions configured to execute on a processing device, the probes are configured to capture network data from network traffic of the communication network and detect by lightweight analysis performed by a first probe of the plurality of probes a data packet of the captured network data that includes information related to a transactional procedure failure transacted by an end-user device. A first probe determines an identity of the end-user device and shares the identity of the end-user device with other probes of the plurality of probes. The probes further add the end-user's identity to respective whitelists associated with the probes of the plurality of probes. In addition, the probes perform, for end-user identities included in the respective whitelists, detailed analysis of network data associated with the end-user identities captured during a predetermined time period.

In one aspect, a method is provided for monitoring a communication network. The method includes capturing network data from network traffic of the communication network by a plurality of probes monitoring the communication network. The method further includes detecting by lightweight analysis a data packet of the captured network data that includes information related to a transactional procedure failure transacted by an end-user device and determining an identity of the end-user device. The method further includes sharing the identity of the end-user device with other probes of the plurality of probes, adding the end-user device's identity to respective whitelists associated with the probes of the plurality of probes, and performing, for end-user device identities included in the respective whitelists, detailed analysis of network data during a predetermined time period.

In a further aspect of the disclosure, the method is performed by a plurality of probes.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

Figure 1:
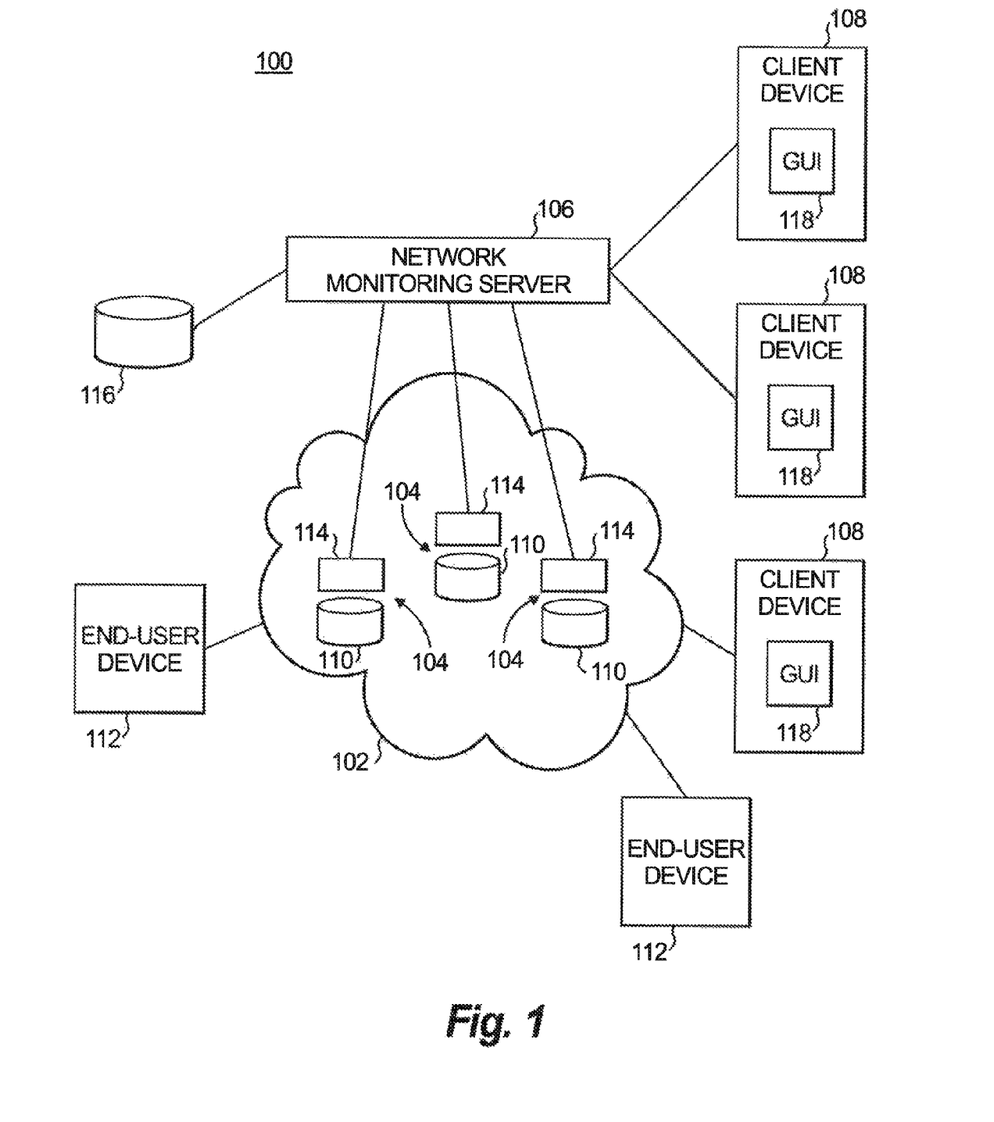
FIG. 1 illustrates a block diagram of a network monitoring system in accordance with the present disclosure.

Description of certain illustrated embodiments of the present disclosure will now be provided. With reference now to FIG. 1, a block diagram of an exemplary network monitoring system 100 is generally shown in which a network 102 is monitored by one or more monitor probes 104 operable to monitor network traffic associated with network 102, including network traffic associated with communication between end-user devices 112. Network monitoring server 106 receives output from the monitor probes 104 and reports the output to one or more client devices 108. The client devices 108 can further be operated by a user to configure the probes 104. The client devices 108 can include a graphical user interface (GUI) 118 for exchanging information with a user, such as an administrator.

Figure 4:
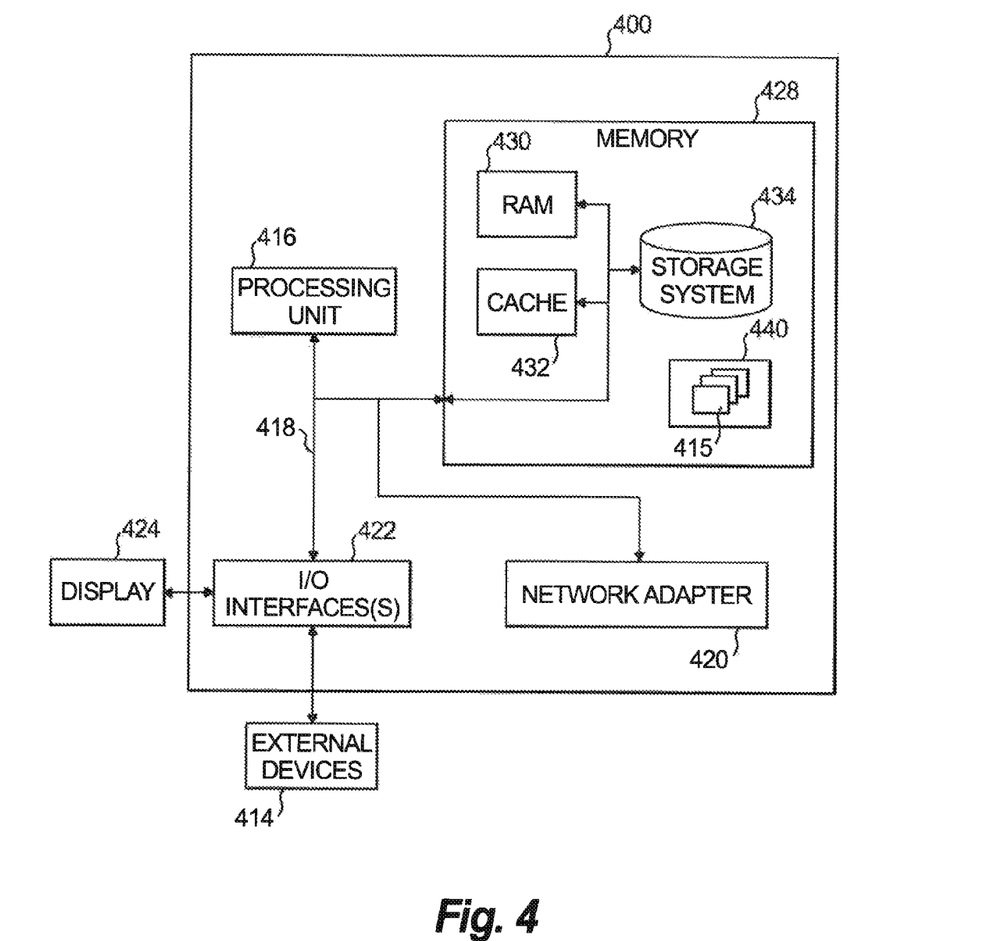
FIG. 4 illustrates internal and external components of computing devices of FIG. 1 in accordance with illustrative embodiment of the present invention.

Each of the computing devices of the network monitoring system 100, e.g., network monitoring server 106, client device 108, end-user device 112, and probe 104, includes a computer having a processor and memory for storing instructions (shown in FIG. 4). The memory can be any type of memory or other computer readable media that stores instructions that are executed by the processor. A computer readable storage medium may be, for example, but not limited to, an electronic, magnetic, optical, electromagnetic, infrared, or semiconductor system, apparatus, or device, or any suitable combination of the foregoing. Generally speaking, network monitoring server 106, client device 108, end-user device 112, and probe 104 can be any type of computer or other computing device containing computer executable program instructions to carry out the functions of the associated device and carry out the method described herein.

The probes 104 each include or access a long term storage device 110, such as a disk storage device and a processor 114 that can access the storage device 110. The processor 114 can further access local short term memory, such as cache or random access memory (RAM). The probes can be configured using any combination of software, hardware, and firmware. In embodiments, one or more of the probes 104 can be virtual probes. The processor 114 and/or the storage device 110 can be remote from the respective locations of the communication network 102 at which the probes 104 access and capture network data.

The network monitoring server 106 communicates with data server storage device 116 to store metric data received from the probes 104 or client devices 108, and to access stored data, such as for providing to the client devices 108 for displaying the metric data using the GUI 118.

Network 102 includes two or more end-user devices 112 that are operatively coupled for data communication. The network 102 can be a data or communication network which can include, for example, a wired or wireless, LAN, WAN, cellular network, and/or radio access network (RAN). The network 102 can include nodes (not shown) that include computing devices, such as routers, terminating devices, connecting points, redistribution points, etc. Monitor probes 104 can be deployed to measure aspects of the network 102 at the nodes or in between the nodes. The monitor probes 104 can be virtual or physical probes and active or passive probes that measure, for example, bandwidth, response time, availability, uptime, etc. The network 102 can connect with or include a portion of the Internet.

End-user devices 112 are computing devices that can connect to the network 102 as nodes. In an embodiment, the end-user devices 112 have access to network 102 as subscribers based on a subscription contract. Two or more end-user devices 112 can communicate with one another. The respective end-user devices 112 can be, for example, a mobile wireless device, such as a cell phone or smart phone, laptop, notebook, tablet computer, palm-sized computer, a fixed device, such as a desktop, or a wired computing device. Examples of types of communication between end-user devices 112 include, for example, without limitation, telephone calls, SMS texts, emails, financial transactions, browsing (e.g., retrieving, presenting, and/or traversing information resources (e.g., identified by a Uniform Resource Identifier (a URI or URL) on a network, such as the Internet), and requesting, transmitting, or receiving data from information resources.

Network traffic, including control plane and/or user plane traffic, is captured by the probes 104 and stored in the respective probe's storage device 110. In embodiments, the captured network traffic is a copy of actual network traffic, wherein the actual network traffic continues along a communication path from a source end-user device 112 to a destination end-user device 112. Lightweight analysis is performed to monitor the captured network traffic for failure conditions that can be predefined. Lightweight analysis includes processing selected fields within each packet data unit (PDU), wherein only a few information elements (e.g., fields) are selected. Examples, without limitation, of one or more information elements selected for lightweight analysis include fields storing one or more of a message code, response code, and/or failure code.

On the other hand, a detailed analysis that is more comprehensive than a lightweight analysis can be performed on selected PDUs. The detailed analysis can include processing all information-elements within the PDU. In addition, the detailed analysis can include correlating the PDUs to a specific session and generating a session record. Control plane PDUs can be stored locally (e.g., in RAM or cached) for short-term storage or in storage device 110 (e.g., disk storage) for long-term storage. These control plane PDUs are processed by the processor 114 for detection of a transactional procedure failure associated with communication between end-user devices 112. For example, the probes 104 capture and monitor control plane PDUs of the network traffic for failure cause codes (e.g., message code, response code, or failure codes) that indicate a failure condition. In embodiments, all control plane PDUs are stored in long-term storage for a user-configurable time period, e.g., 7 days. In other embodiments, all control plane PDUs are stored in short-term storage, and are only stored in long-term storage if whitelisted for long-term storage. Failure cause codes in certain PDUs can be detected by the probes 104. Failure codes can indicate that the associated transaction procedure could not be successfully completed. For example, non-completion of a certain transaction procedure can be indicated by non-receipt, inability to reply, or failure of a reply to at least one of the PDU's associated with the transaction procedure. The probes 104 can determine whether failure cause codes detected in the PDU's indicate occurrence of a predefined failure based on a type of transaction procedure, as indicated by message types and/or command codes of the PDUs. Predefined failures can be selected by a user or by default.

A user can configure the probes 104 to define what constitutes a failure for the particular network 102 by selecting which failure cause codes or combinations of failure cause codes indicate a failure for particular types of transactions. Respective probes 104 can be configured by a user, e.g., an administrator of the network 102, by operating a user input device, for example, via a user interface associated with the probe 104 or via GUI 118 of a client device 108. An end-user of an end-user device 112 can select preferences for failure definitions associated with the end-user device 112 by submitting failure definitions to the network monitoring server 106. When the network monitoring server 106 receives failure definitions, it can configure the probe 104 to use the failure definitions. The failure definitions can be stored local to the processor 114 or in storage devices 110.

When a first probe 104 determines that a transaction procedure failed, the first probe 104 determines an identifier (ID) (e.g., international mobile subscriber identity (IMSI) or international mobile equipment identity (IMEI), without limitation) associated with at least one end-user device 112 involved in transacting the transaction procedure that failed. The first probe 104 causes the determined ID(s) to be whitelisted for a first predetermined time period. In embodiments, the first probe 104 shares the determined ID with the other probes 104 of network 102. The first probe 104, and each probe 104 that the determined ID is shared with, can maintain a whitelist. The whitelist can be stored in the processor's local memory or the storage device 110 and updated as the first predetermined time period expires and other IDs are determined in association with detected failures.

In a distributed embodiment, whitelisted IDs can be identified by each probe 104 independently. A probe that identifies a whitelisted ID can transmit that ID to the other probes 104 to add to their respective whitelists. In this way, the probes 104 can maintain the same set of IDs in their respective whitelists.

In a centralized embodiment, a central whitelist can be used by and updated for some or all of the probe's 104. For example, a probe 104 that detects a failure and determines an associated ID to add to the whitelist can notify a central monitor (not shown) of the ID. The other probes 104 can consult the central whitelist or maintain their own whitelists based on the central whitelist. The central monitor can notify the other probes 104 when the central whitelist is updated or send (e.g., broadcast) the updates to the probes 104. Logic can be included with the whitelists (central or distributed whitelists) that causes entries in the whitelist to be deleted from the whitelist when the first predetermined time period associated with that entry expires.

The first probe 104 can share the determined ID with the other probes 104, such as by having the determined ID broadcast to the other probes 104. In an embodiment, the first probe 104 can transmit the determined ID to the network monitoring server 106, and the network monitoring server 106 can transmit the determined ID to the other probes 104 via individually addressed messages. In embodiments, transmission of the determined ID to the other probes can be performed by the network monitoring server 106 by broadcasting the determined ID. In an embodiment, the first probe 104 can broadcast the ID to the other probes 104.

The probes 104 perform a detailed analysis for a predetermined time period of selected captured network traffic associated with end-user device IDs included on their respective whitelists. The detailed analysis of PDUs associated with whitelisted end-user devices 112 can include a session analysis in which PDUs included in a session are analyzed using a more detailed analysis than that used for a lightweight analysis. The session analysis can be used to detect an error condition regardless of the identity of the end-user device 112.

The predetermined time period can include at least one of a first and second time intervals. The first time interval is defined by a first predetermined length of time "x" before and up until a time T. T can be, without limitation, the time at which a PDU indicating the failure was detected. In embodiments, T can be shared with the other probes 104 when sharing the determined identifier. The selected captured network data associated with the first time interval can include captured network data associated with the whitelisted end-user device 112 identities that was stored by the storage device 110 during the first time interval, e.g., before and up until the failure was detected.

The second time interval is defined by a second predetermined length of time "y" after time T. The selected captured network data associated with the second time interval can include captured network data associated with the whitelisted end-user device identities that was stored local to the processor 114 before being stored by the storage device 110 during the second time interval, e.g., after the failure was detected. Analysis of the selected captured network data associated with the second time interval can be performed in real time. Real time refers to processing PDUs as they are captured from transmission to a destination end-user device 112 and transferred to local memory for short-term storage and before being stored to disk for long-term storage. In contrast, historical time refers to processing PDUs after they were captured from transmission to a destination end-user device 112 and stored to disk for long-term storage. The identity of each whitelisted end-user device 112 is deleted from the whitelist after the second time interval associated with that end-user device 112.

The first and second predetermined lengths (x and y) can be selectable, such as automatically or by an administrator of the network monitoring server 106. For example, the first and second predetermined lengths can be automatically selected based on starting or current memory capacity of the respective probes 104. The memory capacity can include any combination of available storage space in the respective probes' short term or long term memory or the data server storage device 116. Until selected, any of the first and second predetermined lengths can be set to a default value. The network monitoring server 106 can configure the probes 104 with any of the selected first and second predetermined lengths, such as by transmitting (e.g., sending a single recipient message or broadcasting) the respective selected first through fourth predetermined time period to the probes 104.

The network monitoring server 106 can present the captured traffic data and/or analysis results to a user via a GUI. For example, the GUI can include, for example, end-to-end ladder diagrams, intelligent color coded failure analysis, or graphical depictions of complex session flows that show an identified trouble spot at which a failure was detected.

Figure 2:
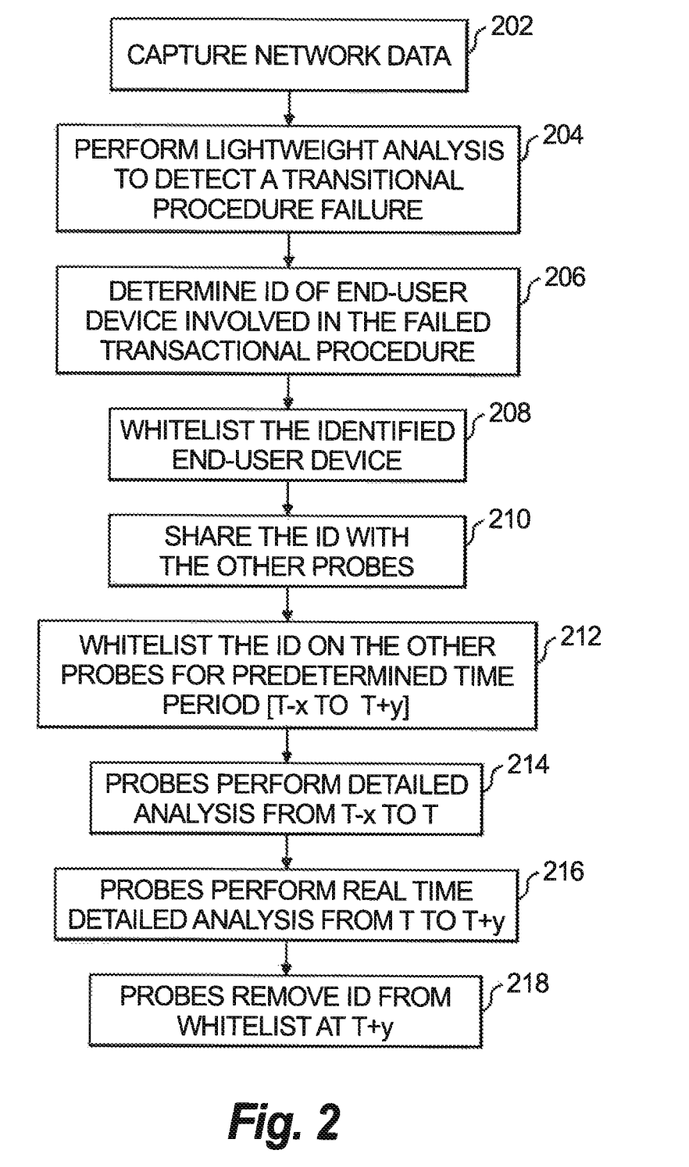
FIG. 2 illustrates a flow diagram of a method in accordance with the present disclosure.

With reference now to FIG. 2, shown is a flowchart demonstrating implementation of the various exemplary embodiments. It is noted that the order of steps shown in FIG. 2 is not required, so in principle, the various steps may be performed out of the illustrated order. Also certain steps may be skipped, different steps may be added or substituted, or selected steps or groups of steps may be performed in a separate application following the embodiments described herein.

At operation 202, probes 104 capture network traffic data. At operation 204, the probes 104 perform lightweight analysis of a portion of the captured network traffic data before storing that portion to long term storage 110. The lightweight analysis is configured to detect a transactional procedure failure. Each probe 104 can monitor the network traffic data at a different location of the network 102. At operation 206, a first probe 104 that detected a transactional procedure failure determines an ID (e.g., IMSI or IMEI) of one or more end-user devices 112 involved in the transaction associated with the transactional procedure failure. At operation 208, the first probe 104 adds each determined ID to a whitelist that the first probe 104 maintains.

At operation 210, the determined ID(s) are shared with the other probes 104 monitoring the network 102. Sharing the ID(s) can include, for example, the first probe 104 transmitting the determined ID(s) to the network monitoring server 106, after which the network monitoring server 106 can broadcast the determined ID(s) to the other probes 104.

At operation 212, the other probes 104 add the determined ID(s) shared with them to their respective whitelists so that the determined IDs will be treated as whitelisted for the predetermined time period spanning [(T−x), (T+y)]. The variables x and y can fixed or selectable. Different values can be assigned to the variables x and y for the respective probes 104 based on their processing capacity. Additionally, the values assigned to the variables can depend upon other factors such as a number of cores processing network traffic. At operation 214, the probes 104 (including the first probe 104 and the other probes 104) perform detailed analysis of network traffic data captured during the time interval [T−x, T]. This detailed analysis can be performed by accessing stored data from long term storage device 110. At operation 216, the probes 104 (including the first probe 104 and the other probes 104) perform detailed analysis of network traffic data captured during the time interval [T, T+y]. This detailed analysis can be performed in real time for all IDs included on the probes' respective whitelists. At operation 218, the determined ID(s) are removed from the respective whitelists at time T+y.

Figure 3:
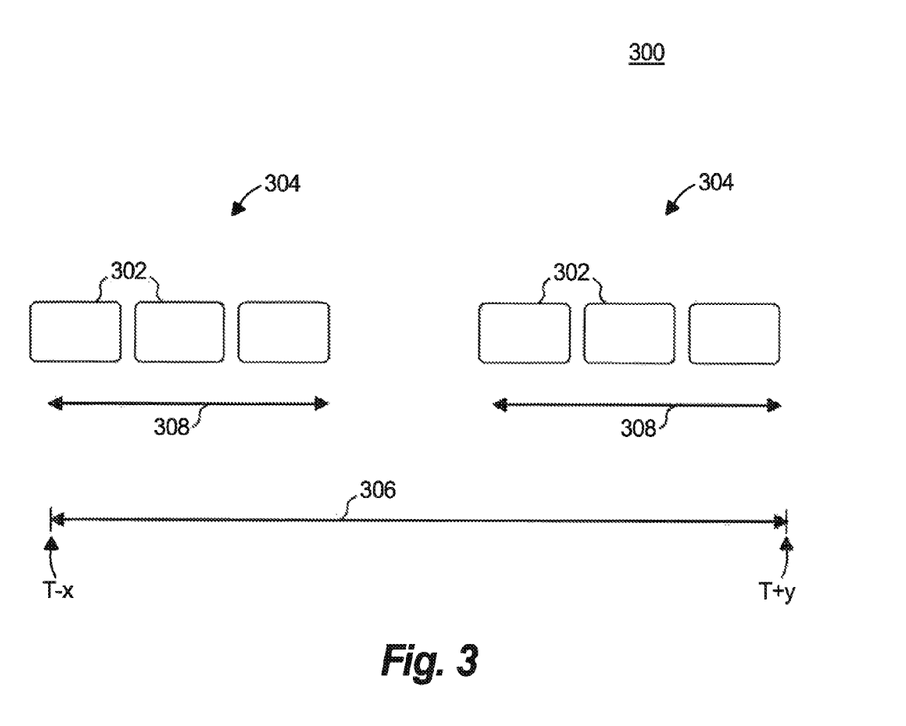
FIG. 3 illustrates a schematic diagram of a light session record (LSR) generated by the network monitoring system of FIG. 1.

FIG. 3 shows a lightweight session record (LSR) 300 that includes PDUs 302 captured between the time interval [T−x, T+y] for an identified end-user device having a particular IMSI or IMEI. The LSR 300 can include PDUs 302 that correspond to one or more complete or partial communication transactions 304, since T−x and T+y may not correlate to the beginning or ending of a communication transaction or session. Line segments 306 represent the duration of the communication transactions (or portions thereof) included in the LSR. Line segment 308 represents the duration of the LSR.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The functionality of the probes 104, network monitoring server 106, client devices 108, and the end-user devices 112 may be implemented with one or more computer systems 400 illustrated in FIG. 4. In various embodiments, computer system 400 may be a server, a mainframe computer system, a workstation, a network computer, a desktop computer, a laptop, an application-specific integrated circuit (ASIC) or field-programmable gate array (FPGA), or the like.

Computer system 400 is only one example of a suitable system and is not intended to suggest any limitation as to the scope of use or functionality of embodiments of the invention described herein. Regardless, computer system 400 is capable of being implemented and/or performing any of the functionality set forth hereinabove.

Computer system 400 is operational with numerous other general purpose or special purpose computing system environments or configurations. Examples of well-known computing systems, environments, and/or configurations that may be suitable for use with computer system 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computer system 400 may be described in the general context of computer system-executable instructions, such as program modules, being executed by a computer system. Generally, program modules may include routines, programs, objects, components, logic, data structures, and so on that perform particular tasks or implement particular abstract data types. Operations performed by computer system 400 may be practiced in distributed data processing environments where tasks are performed by remote processing devices that are linked through a communications network. In a distributed data processing environment, program modules may be located in both local and remote computer system storage media including memory storage devices.

Computer system 400 is shown in FIG. 4 in the form of a general-purpose computing device. The components of computer system 400 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 400 typically includes a variety of computer system readable media. Such media may be any available media that is accessible by computer system 400, and it includes both volatile and non-volatile media, removable and non-removable media.

System memory 428 can include computer system readable media in the form of volatile memory, such as random access memory (RAM) 430 and/or cache memory 432. Computer system 400 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 415 may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the invention as described herein.

Computer system 400 may also communicate with one or more external devices 414 such as a keyboard, a pointing device, a display 424, etc.; one or more devices that enable a user to interact with computer system 400; and/or any devices (e.g., network card, modem, etc.) that enable computer system 400 to communicate with one or more other computing devices. Such communication can occur via Input/Output (I/O) interfaces 422. Still yet, computer system 400 can communicate with one or more networks such as a local area network (LAN), a general wide area network (WAN), and/or a public network (e.g., the Internet) via network adapter 420. As depicted, network adapter 420 communicates with the other components of computer system 400 via bus 418. It should be understood that although not shown, other hardware and/or software components could be used in conjunction with computer system 400. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A communication network monitoring system comprising:
    a plurality of probes coupled to respective locations of a communication network, each of the probes including programmable instructions configured to execute on a processing device, the probes being configured to:
    capture network data from network traffic of the communication network;
    detect by lightweight analysis performed by a first probe of the plurality of probes a data packet of the captured network data that includes information related to a transactional procedure failure transacted by an end-user device;
    determine, by the first probe, an identity of the end-user device;
    share the identity of the end-user device with other probes of the plurality of probes;
    add the end-user device's identity to respective whitelists associated with the probes of the plurality of probes; and
    perform, for end-user identities included in the respective whitelists, detailed analysis of network data associated with the end-user identities captured during a predetermined time period.

2. The communication network monitoring system of claim 1, wherein the predetermined time period includes a first time interval before a time T, T being the time the transactional procedure failure was detected.

3. The communication network monitoring system of claim 2, wherein detailed analysis of the network data captured during the first time interval includes retrieving captured network data associated with the end-user device from a long term storage device.

4. The communication network monitoring system of claim 2, wherein the predetermined time period includes a second time interval after time T.

5. The communication network monitoring system of claim 4, wherein detailed analysis of the network data associated with the second time interval includes analyzing network data in real time that was captured during the second time interval.

6. The communication network monitoring system of claim 4, wherein the identity of the end-user device is deleted from the whitelist after the second time interval.

7. The communication network monitoring system of claim 1, further comprising a server that communicates with the probes via a network, wherein the first probe transmits the identity of the end-user device to the server, and the server transmits the identity of the end-user device to the other probes.

8. The communication network monitoring system of claim 1, wherein the plurality of probes are virtual probes, and the processing device is remote from the respective locations of the communication network.

9. A plurality of probes coupled at respective locations of a communication network, each of the probes comprising programmable instructions configured to execute on a processing device, the probes being configured to:
    capture network data from network traffic of the communication network;
    detect by lightweight analysis performed by a first probe of the plurality of probes a data packet of the captured network data that includes information related to a transactional procedure failure transacted by an end-user device;
    determine, by the first probe, an identity of the end-user device;
    share the identity of the end-user device with other probes of the plurality of probes;
    add the end-user device's identity to respective whitelists associated with the probes of the plurality of probes; and
    perform, for end-user device identities included in the respective whitelists, detailed analysis of network data associated with the end-user identities captured during a predetermined time period.

10. The plurality of probes of claim 9, wherein the predetermined time period includes a first time interval before a time T, T being the time the detected transactional procedure failure was detected.

11. The plurality of probes of claim 10, wherein detailed analysis of the network data captured during the first time interval includes retrieving captured network data associated with the end-user device from a long term storage device.

12. The plurality of probes of claim 10, wherein the predetermined time period includes a second time interval after time T.

13. The plurality of probes of claim 12, wherein detailed analysis of the network data associated with the second time interval includes analyzing network data in real time that was captured during the second time interval.

14. The plurality of probes of claim 12, wherein the identity of the end-user device is deleted from the whitelist after second time interval.

15. The plurality of probes of claim 9, wherein the probe is further configured to transmit, via a network to a server, the identity of the end-user device, and the other probes are configured to receive the identity of the end-user device from the server.

16. The plurality of probes of claim 9, wherein the plurality of probes are virtual probes, and the processing device is remote from the respective locations of the communication network.

17. A method of monitoring a communication network comprising:
    capturing network data from network traffic of the communication network by a plurality of probes coupled to the communication network;
    detecting by lightweight analysis a data packet of the captured network data that includes information related to a transactional procedure failure transacted by an end-user device;
    determining an identity of the end-user device;
    sharing the identity of the end-user device with other probes of the plurality of probes;
    adding the end-user device's identity to respective whitelists associated with the probes of the plurality of probes; and
    performing, for end-user device identities included in the respective whitelists, detailed analysis of network data during a predetermined time period.

18. The method of claim 17, wherein the predetermined time period includes a first time interval before a time T, T being the time the transactional procedure failure was detected.

19. The method of claim 18, wherein performing detailed analysis of the network data captured during the first time interval includes retrieving captured network data associated with the end-user device from a long term storage device.

20. The method of claim 18, wherein the predetermined time period includes a second time interval after time T.

21. The method of claim 20, further comprising:
    storing network data captured during the second time interval for long term storage; and
    performing detailed analysis in real time of network data that was captured during the second time interval.

22. The method of claim 20, wherein the identity of the end-user device is deleted from the whitelist after second time interval.

23. The method of claim 19, further comprising:
    transmitting by a probe of the plurality of probes to a server via a network, the identity of the end-user device; and
    receiving by other probes of the plurality of probes, the identity of the end-user device from the server.

* * * * *